Feb. 10, 1959 O. L. WELKER ET AL 2,873,368

ELECTRICAL CONTROL APPARATUS

Filed May 3, 1955 2 Sheets-Sheet 1

INVENTORS,
Oscar L. Welker,
Lester F. Hetchler
BY Carlson, Pitzner, Hubbard & Wolfe
ATTORNEYS INVENTORS,
Oscar L. Welker,
Lester F. Hetchler
BY Carlson, Pitzner, Hubbard & Wolfe
ATTORNEYS 2,873,368
Patented Feb. 10, 1959

2,873,368

ELECTRICAL CONTROL APPARATUS

Oscar L. Welker, Rockford, and Lester F. Hetchler, Loves Park, Ill., assignors to Barber-Colman Company, Rockford, Ill., a corporation of Illinois Application May 3, 1955, Serial No. 505,674
18 Claims. (Cl. 250—36)

This invention relates generally to control apparatus of the type in which the oscillatory condition of a vacuum tube oscillator and thereby the output current of the latter are varied to perform a control function in accordance with changes in the value of a variable reactance element responsive to a condition such as temperature being controlled. More particularly, the invention relates to condition responsive apparatus in which the value of the reactance element is varied by movement relative thereto of a member of conductive material shiftable with the moving system of a sensitive instrument which measures the controlled condition.

The primary object of the invention is to provide novel apparatus of the above character which, as compared to similar prior apparatus, is simpler and requires fewer components, is less expensive to manufacture, and is more sensitive in producing a greater output current and a wider range of output current values in response to the same amount of movement of the conducting member relative to the reactance element.

Another object is to maintain the accuracy of the measuring instrument by reducing the period of oscillation of the oscillator and thereby the repulsive forces between the conducting member and the reactance element resulting from induction in the member of currents at the oscillator frequency.

A further object is to provide novel apparatus for anticipating changes of a controlled condition without reducing the sensitivity of the oscillator or disturbing the accuracy of the measuring instrument.

Still another object is to provide a novel arrangement of resonant circuits in the oscillator to obtain sufficient output current to operate a load device without intervening stages of amplification and to permit variation of the ratio of changes of output current and reactance values while maintaining the sensitivity of the oscillator.

A more detailed object is to take advantage of the relative values of transconductance and plate resistance of the oscillator tube and thereby obtain high sensitivity to reactance changes by locating one resonant circuit in series with the cathode of the tube.

The invention also resides in the novel arrangement of circuit elements to maintain the apparatus in a safe condition in the event of short circuiting of elements of the oscillator tube.

Other objects and advantages of the invention will become apparent from the following detailed description taken in connection with the accompanying drawings, in which Figure 1 is a schematic wiring diagram of electrical control apparatus embodying the novel features of the present invention.

Figure 1:
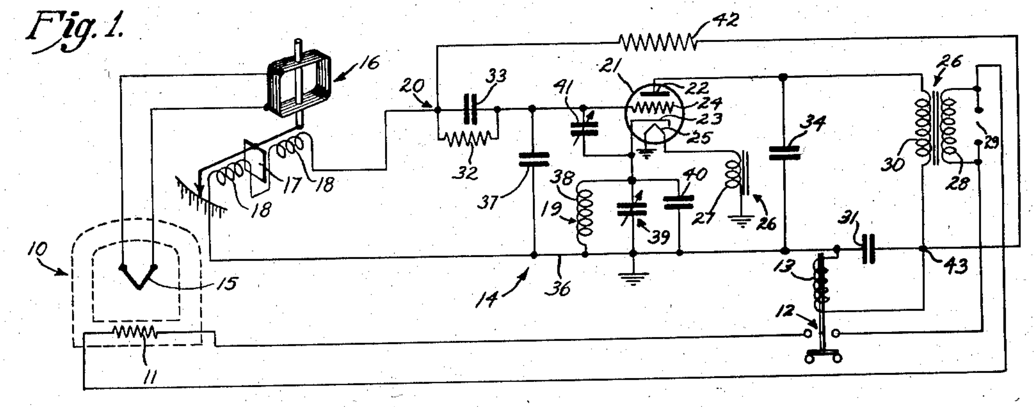

While the invention is susceptible of various modifications and alternative constructions, we have shown in the drawings and will herein describe in detail the preferred embodiment. It is to be understood, however, that we do not intend to limit the invention by such disclosure, but aim to cover all modifications and alternative constructions falling within the spirit and scope of the invention as expressed in the appended claims.

The invention is shown in the drawings for purposes of illustration embodied in a system for controlling the temperature of an electric furnace 10 having an electric resistance heater element 11. Energization of the latter is controlled by normally open contacts 12 of a relay 13 which constitutes a direct current load device in the output circuit of an oscillator 14. To operate the relay in response to changes in the furnace temperature, the voltage of a thermocouple 15 disposed within the furnace is applied to a galvanometer 16 of the D'Arsonval type having a moving system which carries a flag or vane 17 of non-magnetic conducting material such as aluminum. The latter is movable along a predetermined path relative to a pick-up coil 18 which is a part of one of two resonant circuits 19 and 20 of the oscillator 14 and is supported along the flag path to cooperate with the latter to change the effective inductance of the coil and thereby the oscillatory condition of the oscillator and the current flow in its output circuit through the relay 13 in response to changes in the furnace temperature. While this condition responsive variable reactance may be supplied by relatively movable capacitor plates, it is preferred to use a variable inductance element as shown to reduce capacity losses in the lead lines where the element is located remotely from the oscillator.

Generally, the oscillator 14 comprises the two resonant circuits 19 and 20 and a vacuum tube 21 having an anode 22, a cathode 23, a control grid 24, and a separate heater filament 25 for the cathode. In the form shown in Fig. 1, one terminal of the filament is grounded and the other terminal is connected to ground through the secondary 27 of a transformer 26 whose primary 28 is connected to a suitable source 29 of voltage which preferably alternates at a commercially available frequency such as sixty cycles per second. The load or output circuit of the oscillator comprises the coil of the relay 13 in series with another secondary 30 of the transformer providing the anode power supply, a smoothing capacitor 31 being connected across the relay coil. The tube 21 preferably is a double triode such as a 12AU7 with the corresponding electrodes paralleled, but is shown for simplicity as a single triode.

The relay 13 is operated in accordance with changes in the oscillatory condition of the oscillator by connecting a grid leak resistor 32 and a capacitor 33 in parallel circuits between the grid 24 and the cathode 23 and utilizing grid rectified currents to apply a negative bias to the grid and reduce the current in the output circuit when the oscillator is oscillating. In the present instance, the resistor is connected directly across the capacitor. High frequency currents in the anode circuit resulting from oscillation are shunted around the anode power supply 30 and the relay 13 by a by-pass capacitor 34. When the oscillator is in a non-oscillatory condition, the charge on the capacitor 33 supplying the negative bias applied to the grid leaks off through the resistor 32 to permit rectified current to flow from the anode source 30 through the load relay 13 thereby energizing the latter to close the relay contacts 12 and complete an energizing circuit for the furnace heater 11 through the source 29.

To reduce the number of component parts and simplify the system, the present invention contemplates a novel arrangement of the resonant circuits 19 and 20 in the oscillator 14 to obtain sufficient current changes in the output circuit for operation of the relay 13 without intervening amplification stages while attaining sensitivity by supplying such current in response to very small movements of the flag 17 relative to the coil 18. This is accomplished by connecting the resonant circuits in series between the grid 24 and the cathode 23 and further connecting the output circuit to the junction 36 between the resonant circuits thereby locating a first one 19 of the latter in series with the cathode so that it is common to both the input circuit and the output circuit of the oscillator. The second tuned circuit 20 located between the junction 36 and the grid determines the frequency of oscillation of the oscillator while the first circuit 19 cooperates with the capacitance between the grid and the cathode to define a voltage divider which determines the feedback ratio of the oscillator. Such ratio is the proportion applied between the grid and the cathode of the total high frequency voltage appearing across the second tuned circuit.

In the present instance, the pick-up coil 18 comprises two separate halves or sections which are supported on opposite sides of the flag path and are connected between the junction 36 and the grid 23 in series with the grid leak resistor 32 and the capacitor 33 to constitute a part of the second tuned circuit 20. The latter is completed by a capacitor 37 which preferably is connected directly between the grid and the junction to render available between these points the full high frequency voltage of the tuned circuit without losses in the leads to the pick-up coil. Like the second circuit, the first tuned circuit 19 is a parallel resonant one comprising a coil 38 and two capacitors 39 and 40, one fixed and one variable, connected in parallel between the cathode and the junction. To permit adjustment of the tuning capacitor 39 safely without special insulated tools, the junction between the tuned circuits preferably is grounded as shown.

The values of the respective tuned circuit elements are such that, when the flag 17 is remote from the pick-up coil 18, the effective reactance of the first circuit 19 between the cathode 23 and the junction 36 is inductive in character so that no oscillations exist in the oscillator. Under this condition, the rectified current of the supply 30 through the relay 13 is at its maximum value and the relay pulls in to close its contacts 12 in the circuit of the furnace heater 11.

As the furnace temperature rises and the flag 17 approaches a predetermined control position between the sections of the coil 18, the inductance of the latter decreases thereby increasing the resonant frequency of the second tuned circuit 20. With this frequency increasing, the reactance of the first circuit becomes less and less inductive until, at the predetermined position, this reactance becomes capacitive in character. The condition of the oscillator 14 then becomes oscillatory with the strength of oscillations depending on the feedback ratio of the capacity between the cathode 23 and the junction 36 to that between the junction and the grid 24. Further movement of the flag beyond the control position continues to increase the resonant frequency thereby increasing the feedback ratio and the strength of the oscillations.

As discussed above, oscillations result in the application of a negative bias to the grid 24 by the grid leak resistor 32 and capacitor 33 to reduce the load current through the relay 13 when the oscillator 14 is oscillating. The amount of such bias and reduction of load current vary with the strength of the high frequency oscillations and therefore the position of the flag 17 relative to the pick-up coil 18. At a predetermined control value of the furnace temperature which is reached before the pick-up coil inductance reaches a minimum, the load current is reduced sufficiently that the relay drops out to interrupt the energizing circuit for the furnace heater 11.

Figure 5:
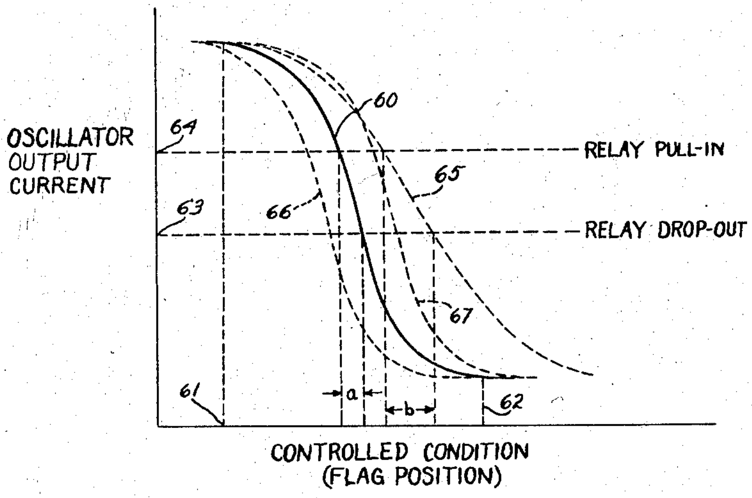
Fig. 5 is a plot of oscillator output current against a controlled condition.

Referring to Fig. 5 in which the curve 60 is a plot of the output current through the load relay 13 against either the furnace temperature or the flag position, it will be seen that the output current is a maximum when the temperature is below a value 61 and the flag is relatively remote from the pick-up coil, the oscillator then being nonoscillatory. As the temperature increases beyond this value and the flag moves into the coil or to the right along the abscissa of the chart of Fig. 5, oscillations begin as described above and, as the feedback ratio of the oscillator and the strength of the oscillations increase, the output current decreases along the curve 60 to a minimum at a temperature value 62. Energization and deenergization of the relay may occur at different points within this wide range of output values. For example, deenergization of the relay may occur at an output current value 63 while energization or pull-in occurs at a higher value 64. For the circuitry described thus far, variation of the controlled condition or the flag position through a narrow range indicated at *a* results in operation of the relay.

In one system constructed as described above and utilizing a 12AU7 tube with its electrodes paralleled, movement of the flag 17 relative to the pick-up coil 18 resulted in variation of the oscillator output relay current from a maximum of 13 milliamperes to a minimum of .5 of a milliampere where the anode source 30 supplied an alternating voltage of 260 volts at 60 cycles per second and the load relay resistance was approximately 10,000 ohms with its shunting capacitor 31 of a value of 8 microfarads. The operating frequency was between 26 and 27 megacycles and the values of the elements of the first resonant circuit 19 respectively were .5 of a microhenry for the coil 38, 22 micromicrofarads for fixed capacitor 40, and 8 to 50 micromicrofarads for the variable tuning capacitor 39. The values of the capacitor 37 and the by-pass capacitor 34 respectively were 10 micromicrofarads and .001 of a microfarad and the grid leak resistor 32 and capacitor 33 had values of 1.2 megohms and .02 of a microfarad respectively. In the second resonant circuit 20, the inductance of the pick-up coil 18 varied from 1.160 microhenries to .9445 of a microhenry with flag movement through a range of .3 of an inch, the change of inductance with flag movement being substantially linear over this range. With this system, a movement of the flag 17 as small as .006 of an inch accompanied by a change of pick-up coil inductance of only approximately .0043 of a microhenry was sufficient to actuate the relay from pull-in to drop-out and vice versa.

Advantage is taken of the strength of the high frequency oscillations available with the first tuned circuit 19 in series with the cathode 23 to reduce the repulsive force between the flag 17 and the pick-up coil 18 and thereby avoid inaccuracies in the operation of the measuring instrument 16. For this purpose, the RC time constant of the grid leak resistor 32 and the capacitor 33 is made sufficiently long that, when an oscillatory condition exists, the oscillations occur over only a minor portion of each half cycle of the anode power supply 30. This is possible because the high frequency oscillations for this short period are strong enough to develop and maintain the required grid bias during the entire half cycle. Suitable values of the resistor and the capacitor for limiting the oscillations to such short periods are given above. With the repulsive force between the flag and the pick-up coil proportional to the time the high frequency oscillations occur and with the mechanical time constant of the moving parts of measuring instrument 16 longer than the periods of the anode supply, the repulsive force exerted during the short bursts of oscillation is averaged over the complete cycle of the anode supply voltage and the average repulsion force thereby is reduced substantially.

The high sensitivity of the novel circuitry described above, that is, variation of the oscillator output current through a wide range in response to a small movement of the flag 17 relative to the coil 18, is believed to be a direct result of location of the first tuned circuit 19 in series with the cathode 23. With this location, the load impedance for the oscillator at its high oscillation frequencies, in effect, is the impedance of the tuned circuit 19 in parallel with the resistance of the tube 21 looking to the cathode. This resistance may be defined as the reciprocal of the transconductance of the tube. The transconductance being defined as the quotient of the amplification factor of the tube divided by the plate resistance, the resistance shunting the tuned circuit is equal to the plate resistance divided by the amplification factor.

In the circuit described above with a 12AU7 tube having an amplification factor of 17, the shunting resistance varies between values of approximately 200 and 5000 ohms respectively at the minimum and maximum values of oscillator plate current through the load relay 13. This range of values is well below the impedance of approximately 12,300 ohms for the tuned circuit at the oscillator frequencies with the circuit elements having the approximate values given above. Thus, variation of the oscillator output current produces a wide variation in the load impedance of the oscillator constituted by the tuned circuit 19 and its shunting resistance. Since the gain of a vacuum tube in an oscillator increases with the oscillator load impedance, the change from the nonoscillatory to the oscillatory condition caused primarily by the increase of feedback ratio upon movement of the flag relative to the coil is accompanied by an increase of gain of the tube. The combined effects of the changes in feedback ratio and gain produce a rapid change from no oscillations to strong oscillations in response to a small movement of the flag.

Such strong oscillations enable a high negative bias to be developed across the grid leak capacitor 33 thereby achieving effective suppression of the plate current through the load relay 13 during oscillations while permitting a high value of plate supply voltage for a correspondingly high value of plate curent under nonoscillatory conditions. Thus, the plate current through the load relay varies through a wide range in response to small movements of the flag.

Since the strength of the high frequency oscillations and therefore the load current vary in accordance with the ratio of the capacitance between the cathode 23 and ground to the capacitance between the grid 24 and the cathode, variation of the rate of change of load current in response to flag movement may be accomplished simply by connecting a capacitor 41 externally between the grid and the cathode. This capacitor is added to the internal grid to cathode capacitance of the tube and increases the effective capacitance between the grid and the cathode and thereby the amount of capacitance between the cathode and ground required to produce a given feedback ratio. The capacity effective between the cathode and ground in turn varying with flag movement, a correspondingly larger movement, is required to produce a given change of load current. Preferably, the external capacitor 41 is variable as shown to permit adjustment of the feedback ratio. The effect of adding the external capacitor 41 is illustrated in Fig. 5 in which the dotted curve 65 represents the variation of output current with furnace temperature when the capacitor is added. It will be seen that this curve is less steep than the curve 60 and that the range *b* of temperature values and flag movement between pull-in and drop-out of the relay is much greater than the range *a* without the capacitor.

Means is provided to avoid the unsafe condition of pull-in of the relay 13 when the circuit through the pick-up coil 18 is interrupted. This means comprises a resistor 42 which is connected between the grid 24 and a point in the output circuit having a negative potential relative to the cathode and which has sufficiently high resistance to avoid interference with normal operation of the system. Such negative potential is obtained by connecting the anode power supply 30 between the anode 22 and the load relay 13 and the bias resistor 42 between the cathode side of the grid control capacitor 33 and the junction 43 of the supply 30 and the relay 13.

When the pick-up coil circuit is intact and no oscillations exist, a negligible amount of direct current flows through the fail safe resistor 42 and the pick-up coil 18 to ground and the grid 24, in effect, is short circuited to the cathode 23 through the pick-up coil to permit current flow through the tube at a value sufficient for pull-in of the relay 13. When the pick-up circuit is interrupted, however, current flow in the output circuit at a value below that required for pull-in of the relay produces a negative potential at the anode terminal 43 of the relay and this potential is applied to the grid through the fail safe resistor 42 thereby maintaining the relay deenergized. A suitable value for this bias resistor is 10 megohms.

In accordance with another aspect of the invention, the external circuits connected to the cathode 23 and the heater filament 25 are arranged in a novel manner to avoid a short circuit shunt around the first tuned circuit 19 upon contact of the cathode 23 with the heater filament within the tube. For this purpose, one terminal of the filament is connected directly to the cathode and the energizing circuit for the filament includes an impedance element presenting a high impedance to current of the high oscillator frequency. This arrangement is obtained in a modified circuit shown in Fig. 2 by forming the inductance coil 38 as a bifilar winding having two halves $38^a$ and $38^b$ which are connected in series with each other and the filament 25 across the filament source 27. Corresponding ends of the coil halves are short circuited to each other to form the high frequency inductance by capacitors 44 and 45 each having a relatively low capacity on the order of .001 of a microfarad so as to block the low frequency current of the filament source 27 and act as a short circuit to the high frequency oscillator currents. With this arrangement, the filament 25 may be connected directly to the cathode 23 externally of the tube 21 so that operation of the system is unaffected by contact of these parts within the tube. At the high oscillator frequencies, the coil halves $38^a$ and $38^b$ act as one with substantially the same characteristics as a single coil in the tuned circuit, the halves providing a low impedance path for the low frequency currents of the filament source 27.

Control systems of the type described above are characterized by a time lag between operation of the condition controlling device, herein the heater 11, in a sense to correct for deviations of the controlled condition, the oven temperature, from a predetermined control value and return of the controlled condition to the control value in response to operation of the controlling device. Such time lag results in undesired fluctuations of the controlled condition about the control value. Where the controlled condition is the temperature of a furnace as in this instance, the time lag is due to the thermal inertia of the furnace.

The present invention, in another of its aspects, contemplates reduction of such fluctuations in the controlled condition by the provision of novel apparatus which anticipates changes in the controlled condition from the control value while, at the same time, maintaining the accuracy of the measuring instrument 16 and the sensitivity of the condition responsive parts including the oscillator 14. Generally, this apparatus, shown in the modified circuits of Figs. 3 and 4, comprises one of the reactance elements of the tuned circuits 19 and 20 and a member 46 of conductive material. The member is movable back and forth relative to the element to vary its reactance by time delay means responsive to changes in the output current through the load relay 13. The parts of the modified circuit corresponding to those of the preferred circuit of Fig. 1 bear the same reference numbers.

Figure 4:
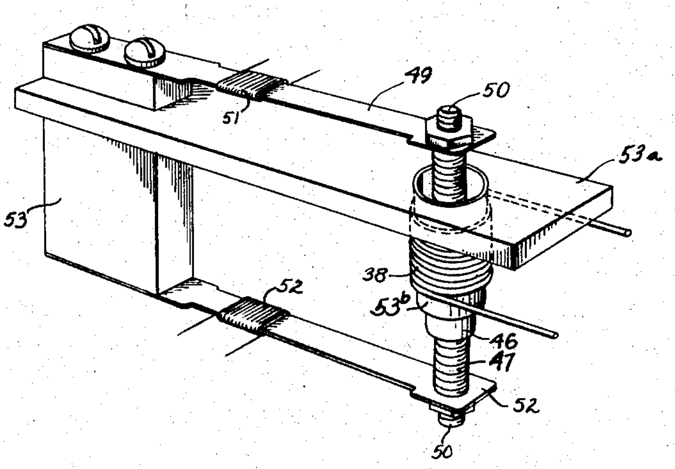
Fig. 4 is a perspective view of the variable anticipating reactance element of Fig. 3.

In the present instance, the variable reactance element of the anticipating apparatus is the inductance coil 38 of the first resonant circuit 19 and the conducting member 46 is a slug of aluminum threaded onto a rod 47 of insulating material spanning two bimetal strips 48 and 49. The latter are apertured at their outer ends to receive reduced ends 50 of the rod which may be threaded to receive nuts as shown in Fig. 4. The strips, together with heaters 51 and 52 of wire encircling the respective strips and separated therefrom by insulation tape (not shown) constitute the time delay means. The strips have similar temperature responsive characteristics and are secured at their inner ends to a block 53 of insulating material. The coil is wound around an insulating tube $53^b$ encircling the slug and rigid with an arm $53^a$ of insulating material secured to the block 53.

To compensate for ambient temperature changes, the direction of warp or flexing of each of the bimetal strips 48 and 49 is opposed to that of the other strip. Energizing circuits of the heaters 51 and 52 extend through alternately operated contacts 54 and $54^a$ of the load relay 13, a secondary 55 of the transformer 26, and individually adjustable resistors 56 and 57 by which the time constants of the different heaters and strips may be varied. These time constants also are determined by the selection of the type and amount of insulation material separating each heater from its bimetal strip and the mass of the bimetal and the heater itself. It will be seen that the above arrangement of the two bimetal strips for supporting the conducting slug 46 not only provides compensation for ambient temperature changes but also permits selective adjustment of the time constant of each heater and its strip by varying the value of the associated resistor.

Figures 2, 3:
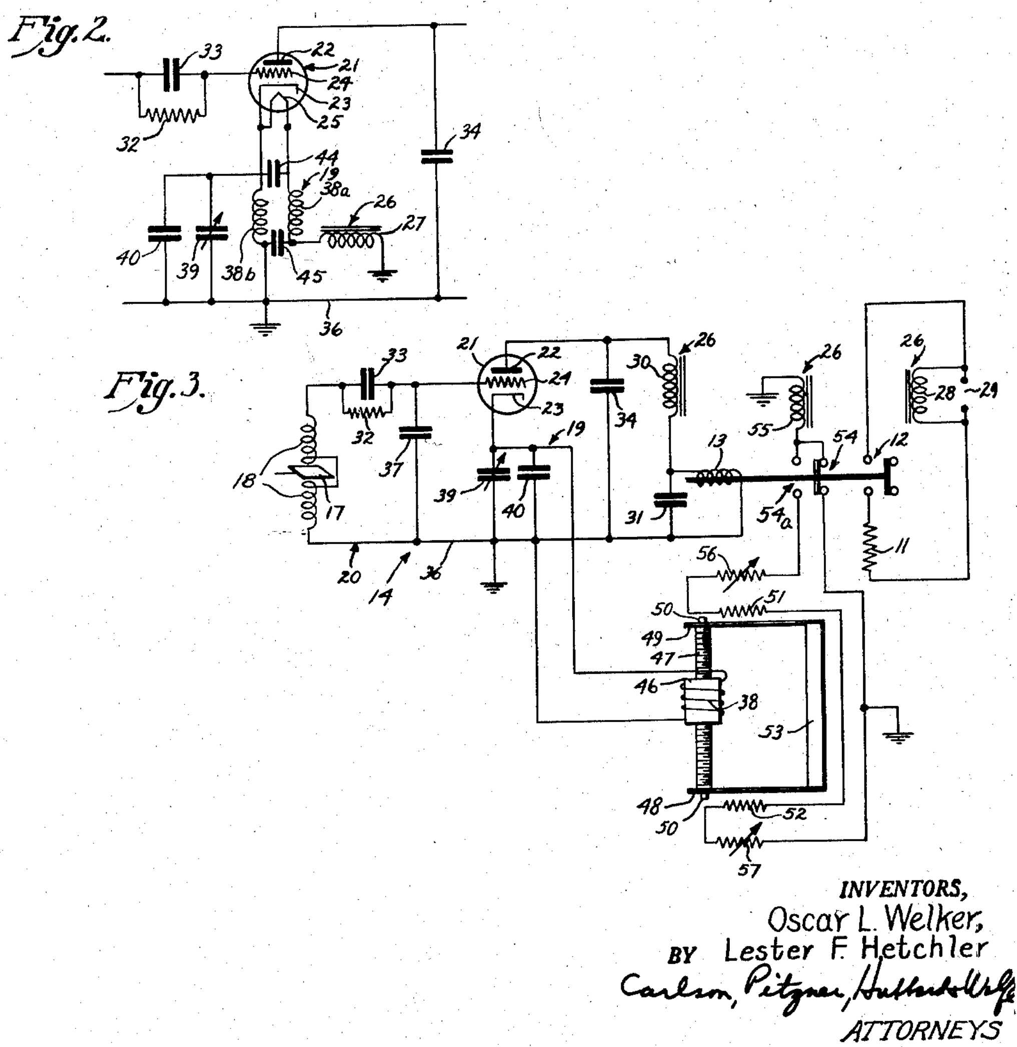
Fig. 2 is a wiring diagram showing a modification of the apparatus of Fig. 1.
Fig. 3 is a wiring diagram of a further modification for anticipating control.

When the flag 17 of the modified circuit of Fig. 3 moves away from the pick-up coil 18 or to the left along the abscissa of the chart of Fig. 5 in response to a call for heat and the relay 13 is energized in response to the resulting cessation of oscillations, the relay contacts 12 and 54 are closed to complete the energizing circuits for the furnace heater 11 and the heater 51 of one bimetal strip 49 supporting the slug 46. Also, the contacts $54^a$ are opened for deenergization of the heater 52 for the other bimetal strip 48. As a result, the slug is shifted axially and out of the coil 38 to raise the inductance of the latter in the first resonant circuit 19 and lower the frequency at which the impedance of this circuit becomes capacitive. Thus, the oscillator 14 is rendered oscillatory to deenergize the load relay 13 before the flag returns to the position it occupied before the call for heat. Stated another way, the control point is shifted downwardly. This condition is illustrated in Fig. 5 in which the dotted curve 66 represents the plot of output current against flag position when the slug is remote from the coil 38.

Deenergization of the load relay 13 results in interruption of the circuits through the furnace heater 11 and one bimetal heater 51 at the contacts 12 and 54 and completion of the circuit through the other bimetal heater 52. This produces a shift of the slug 46 into the coil 38 so as to lower the inductance of the coil in the first resonant circuit 19 and raise the frequency at which the impedance of this circuit becomes capacitive for oscillations. The control point thus is shifted upwardly as represented by the dotted curve 67 in Fig. 5 and the oscillator 14 ceases oscillation to reenergize the load relay before the furnace temperature drops to the control value. By adjusting the resistors 56 and 57 in series with the respective bimetal heaters 51 and 52, the time constants of the anticipating parts may be correlated closely with the thermal delay characteristics of the furnace. The amount of change of inductance of the coil 38 for movement of the slug 46 through a given range varies with the location of the range axially of the coil. Thus the total amount of shift of the control point in response to energization and deenergization of the bimetal heaters 51 and 52 may be varied by changing the quiescent position of the slug along its rod 47 and axially relative to the coil.

The novel apparatus described above is capable of producing sufficient output current to actuate the relay 13 in response to very small movements of the flag 17 and the accompanying small changes of pick-up coil inductance without additional amplification stages. As a result, few circuit components are required and the cost of the apparatus is less than that of similar apparatus used heretofore. Such sensitivity of the oscillator 14 is believed to be due to the location of the first resonant circuit 19 in series with the cathode 23 so as to utilize the combined effects of increasing gain of the tube and increasing feedback ratio to produce wide changes in the strength of oscillations and thereby the output current upon movement of the flag short distances. Due to the strength of oscillations available with this location of the first resonant circuit, the periods of oscillation are short with correspondingly small repulsive forces between the pick-up coil 18 and the flag 17 to maintain the accuracy of the galvanometer 16 and the system.

By varying the effective value of one of the reactive elements of the resonant circuits 19 and 20, anticipating control may be achieved without disturbing the accuracy of the galvanometer. The arrangement of the two bimetal strips 48 and 49 and the separate heaters 51 and 52 for the aluminum slug 46 enables the amount of shift of the control point in opposite directions to be varied selectively to simulate and overcome different time lags inherent in the system.

We claim as our invention:

1. In a control system, the combination of, an oscillator having a ground point and comprising a vacuum tube having an anode, a cathode, a control grid, and a separate heater filament having two terminals one of which is short circuited to the cathode, a first resonant circuit connected between ground and said grid, and a second resonant circuit connected between ground and said cathode, one of said circuits having an element whose reactance is variable to control the condition of said oscillator and render the same oscillatory at predetermined high frequencies and nonoscillatory respectively in response to changes in a condition to be controlled, an inductance element in said second circuit comprising two coils connected in parallel by capacitors joining corresponding ends of the coils, and an energizing circuit for said filament including a source of low frequency alternating voltage and extending from one filament terminal to ground through one of said coils in series and from the other filament terminal to ground through the source and the other of said coils in series, said capacitors having low capacities and presenting high impedance to current of said low frequency and low impedance to current of said high frequencies.

2. In a control system, the combination of, an oscillator having a ground point and comprising a vacuum tube having an anode, a cathode, a control grid, and a separate heater filament having two terminals one of which is short circuited to the cathode, a first resonant circuit connected between ground and said grid, and a second resonant circuit connected between ground and said cathode, one of said circuits having an element whose reactance is variable to control the condition of said oscillator and render the same oscillatory at predetermined high frequencies and nonoscillatory respectively in response to changes in a condition to be controlled, an inductance element in said second circuit comprising two coils connected in parallel by capacitors joining corresponding ends of the coils, and an energizing circuit for said filament including a source of supply voltage and extending from said one filament terminal to ground through one of said coils in series and from the other filament terminal to ground through the source and the other coil in series, said capacitors having low capacities and presenting high impedance to current of said supply source and low impedance to current of said high frequencies of oscillation.

3. In control apparatus, the combination of, an oscillator having an output circuit and a tuned circuit including a variable reactance element, means for varying the oscillatory condition of said oscillator and the current flow in said output circuit thereof in response to changes in opposite senses of a condition being controlled, said oscillatory condition also varying in response to changes of reactance of said element, a member of conductive material, means supporting said element and said member adjacent each other and including spaced bimetal strips mounted to flex in opposition to each other and to shift the element and the member in opposite directions relative to each other to vary the reactance of the element in response to differential heating of the two strips, separate heaters supported in heat transfer relation with the respective bimetal strips, separate energizing circuits for said heaters, a selectively variable impedance in each of said energizing circuits, and means responsive to said current in said output circuit and operable to complete said energizing circuits alternately in response to different values of the current to shift said member and said element relatively and vary the reactance of the element to anticipate changes of the controlled condition by changing said oscillatory condition in senses opposite to the changes resulting from variation of the controlled condition.

4. In a control system, the combination of, a first member of conductive material movable back and forth along a predetermined path in response to changes of a condition to be controlled, an oscillator having an output circuit and a variable reactance element, an inductance coil in said oscillator, the oscillatory condition of said oscillator varying in response to changes in the said element and to changes in the inductance of said coil, means supporting said element along said path for cooperation with said member to vary the effective reactance of the element in response to relative movement between the two, a second member of conductive material, a support for said coil, a pair of bimetal strips of similar temperature responsive characteristics mounted on said support in spaced positions for flexure in opposition to each other and supporting said second member between them and adjacent said coil for movement relative to the latter to change the inductance thereof in response to flexure of the strips, electric heater means supported in heat transfer relation with the respective bimetal strips, and energizing circuits for said heater means responsive to the oscillatory condition of said oscillator and current flow in said output circuit thereof and operating to energize the heater means to shift said second member relative to said coil in a direction to produce a change in the oscillatory condition in a sense opposite to any change in such condition resulting from a change in the controlled condition and the accompanying movement of said first member relative to said element.

5. In a control system, the combination of, a first member of conductive material movable back and forth along a predetermined path in response to changes of a condition to be controlled, an oscillator having an output circuit and first and second variable reactance elements of the same type of reactance, the oscillatory condition of said oscillator varying in response to changes in the value of reactance of either of said elements, means supporting said first element along said path for cooperation with said member to vary the effective reactance of the element in response to relative movement between the two, a second member of conductive material, means supporting said second member and said second element adjacent each other and including a pair of bimetal strips of similar temperature responsive characteristics mounted to flex in opposition to each other and to shift the second member and the second element relative to each to change the reactance of the element in response to flexure of the strips, electric heater means supported in heat transfer relation with the respective bimetal strips, and energizing circuits for said heater means responsive to said oscillator and current flow in said output circuit thereof and operating to energize the heater means for shifting said second member relative to said second element in opposite directions to anticipate changes in said oscillator in a sense opposite to each change of the oscillator resulting from a change in the controlled condition.

6. In a control system, the combination of, a first member of conductive material movable back and forth along a predetermined path in response to changes of a condition to be controlled, an oscillator having an output circuit and first and second reactance elements, the oscillatory condition of said oscillator varying in response to changes in the reactance of either of said elements, means supporting said first element along said path for cooperation with said member to vary the effective reactance of the element in response to relative movement between the two, a second member of conductive material, means supporting said second member and said second element adjacent each other and including a bimetal strip for changing the relative position of the two to change the reactance of the element in response to flexure of the strip, an electric heater supported in heat transfer relation with said bimetal strip, and an energizing circuit for said heater responsive to said oscillator and current flow in said output circuit thereof and operating to energize the heater to shift said second member relative to said second element in a direction to anticipate a change of the controlled condition in one sense by producing a change in said oscillator in a sense opposite to a change of the oscillator resulting from a change of the controlled condition in a sense opposite to said one sense.

7. In a control system, the combination of, an oscillator having an output circuit and a variable reactance element, means for varying the oscillatory condition of said oscillator and the current flow in said output circuit thereof in response to changes in opposite senses of a condition being controlled, said oscillatory condition also varying in response to changes of reactance of said element, a member of conductive material, means supporting said element and said member adjacent each other and including a bimetal strip for changing the relative positions of the two to change the reactance of the element in response to flexure of the strip, an electric heater supported in heat transfer relation with said bimetal strip, and an energizing circuit for said heater responsive to said oscillator and current flow in said output circuit thereof and operating to energize the heater to shift said member relative to said element in a direction to anticipate a change of the controlled condition in one sense by producing a change in said oscillator condition in a sense opposite to a change of the oscillator condition resulting from a change of the controlled condition in a sense opposite to said one sense thereof.

8. In control apparatus, the combination of, an oscillator having an output circuit and a tuned circuit including a variable reactance element, means for varying the oscillatory condition of said oscillator and the current flow in said output circuit thereof in response to changes in opposite senses of a condition being controlled, said oscillatory condition also varying in response to changes of reactance of said element, a member of conductive material, means supporting said element and said member adjacent each other and including selectively variable time delay means operating when energized in different senses to shift the element and the member relative to each other to vary the reactance of the element and said oscillatory condition, and means responsive to said oscillatory condition and changes in the current flow in said output circuit and operating to energize said time delay means alternately in said different senses at different values of the output current to shift member and said element relatively and vary the reactance of the element to anticipate changes of the controlled condition by changing said oscillatory condition in senses opposite to the changes resulting from variation of the controlled condition.

9. In control apparatus, the combination of, a member of conductive material movable back and forth along a predetermined path in response to changes of a condition to be controlled, an oscillator comprising a vacuum tube having an anode, a cathode, and a control grid and two resonant circuits connected in series between said grid and said cathode and having capacitive and inductive reactance elements, means supporting one of said elements along said path for cooperation with said member to vary the effective reactance of the element in response to relative movement between the two, said resonant circuit elements having values correlated to produce, between said cathode and the junction of said resonant circuits, an effective reactance which is inductive when said member is on one side of a predetermined position relative to said one element and is capacitive to cooperate with the capacitive reactance between said grid and the cathode for oscillation of said oscillator when the member is on the other side of the predetermined position, a grid leak resistor and a capacitor connected in parallel circuits between said grid and said cathode and operating to bias the grid negatively during oscillation of said oscillator, and an output circuit including a source of alternating current between said anode and said junction of said resonant circuits, said resistor and said capacitor having a time constant sufficiently long to prevent oscillation of said oscillator through a major portion of each half cycle of said source.

10. In a control system, the combination of a member of conductive material movable back and forth along a predetermined path in response to changes of a condition to be controlled, an oscillator comprising a vacuum tube having an anode, a cathode, and a control grid and first and second resonant circuits having capacitive and inductive reactance elements and connected in series between the grid and the cathode with the first circuit between the grid and the second circuit, means supporting one of said elements adjacent said path for variation of the effective reactance of the element in response to movement of said member relative to the element, an output circuit including a source of alternating current connected between said anode and the junction of said resonant circuit, said first circuit having a predetermined resonant frequency when said member is in a predetermined position relative to said one element and said second circuit having an inductive reactance when the member is on one side of said position and a capacitive reactance to provide regenerative feedback between said anode and said grid when the member is on the other side of said position, and a grid leak resistor and a capacitor connected in parallel circuits between said cathode and said grid to apply a negative bias to the latter and reduce the current in said output circuit during oscillation of said oscillator, said resistor and said capacitor having a time constant sufficiently long to prevent oscillation of said oscillator through a major portion of each half cycle of said source.

11. In apparatus for controlling a condition, an oscillator comprising a vacuum tube having an anode, a cathode, and a control grid and two resonant circuits having reactance elements and connected in series between said grid and said cathode, means for changing the effective reactance of one of said elements in response to variation of said condition about a predetermined control value, an output circuit connected between said anode and the junction of said resonant circuit and including a source of voltage and a load impedance, a grid leak resistor and a capacitor connected in parallel circuits between said grid and said cathode and operating to bias the grid negatively and reduce current flow in said output circuit during oscillation of said oscillator, said resonant circuit elements having values correlated to produce, between said cathode and said junction, an effective reactance which is inductive when the value of said controlled condition varies from said predetermined value in one sense and is capacitive to cooperate with the capacitive reactance between said grid and the cathode to provide feedback between the grid and the anode for oscillation of said oscillator when the value of the condition varies from said predetermined value in the opposite sense, and a capacitor connected between said grid and said cathode to increase the total capacity between the grid and the cathode thereby reducing the feedback ratio of the oscillator and thus the ratio of changes of current in said output circuit to changes of capacity of said effective reactance between said cathode and said junction.

12. In control apparatus the combination of, a member of conductive material movable back and forth along a predetermined path in response to changes of a condition to be controlled, an oscillator comprising a vacuum tube having an anode, a cathode, and a control grid and two resonant circuits having reactance elements and connected in series between said grid and said cathode, means supporting one of said elements along said path for cooperation with said member to vary the effective reactance of the element in response to relative movement between the two, a load device adapted to be energized by the flow therethrough of current of a predetermined value, an output circuit connected between said anode and the junction of said resonant circuit and including a source of voltage and said load device in series, and a grid leak resistor and a capacitor connected in parallel circuits between said grid and said cathode and operating to bias the grid negatively to maintain current flow in said output circuit below said predetermined value during oscillation of said oscillator, said resonant circuit elements having values correlated to produce, between said cathode and said junction, an effective reactance which is inductive when said member is on one side of a predetermined position relative to said one reactance element and is capacitive to cooperate with the capacitive reactance between said grid and the cathode to provide feedback between the grid and the anode for oscillation of said oscillator when the member is on the other side of said position.

13. In control apparatus, the combination of, a member of conductive material movable back and forth along a predetermined path in response to changes of a condition to be controlled, an oscillator comprising a vacuum tube having an anode, a cathode, and a control grid and two resonant circuits having reactance elements and connected in series between said grid and said cathode, means supporting one of said elements along said path for cooperation with said member to vary the effective reactance of the element in response to relative movement between the two, an output circuit connected between said anode and the junction of said resonant circuits, and a grid leak resistor and a capacitor connected in parallel circuits between said grid and said cathode and operating to bias the grid negatively during oscillation of said oscillator, said resonant circuit elements having values correlated to produce, between said cathode and said junction, an effective reactance which is inductive when said member is one side of a predetermined position relative to said one reactance element and is capacitive to cooperate with the capacitive reactance between said grid and the cathode to provide feedback between the grid and the anode for oscillation of said oscillator when the member is on the other side of said position.

14. In a control system, the combination of, a member of conductive material movable back and forth along a predetermined path in response to changes of a condition to be controlled, an oscillator comprising a vacuum tube having an anode, a cathode and a control grid and first and second resonant circuits having capacitive and inductive reactance elements and connected in series between the grid and the cathode with the first circuit between the grid and the second circuit, means supporting one of said elements adjacent said path for variation of the effective reactance of the element in response to movement of said member relative to the element, an output circuit connected between said anode and the junction of said resonant circuits, and a grid leak resistor and a capacitor connected in parallel circuits between said cathode and said grid to apply a negative bias to the latter and reduce the current in said output circuit during oscillation of said oscillator, a said first circuit having a predetermined resonant frequency when said member is in a predetermined position relative to said one element and said second circuit having an inductive reactance when the member is on one side of said position and a capacitive reactance to provide regenerative feedback between said anode and said grid when the member is on the other side of said position.

15. In a control system, the combination of, a member of conductive material movable back and forth along a predetermined path in response to changes of a condition to be controlled, an oscillator comprising a vacuum tube having an anode, a cathode and a control grid and first and second resonant circuits having capacitive and inductive reactance elements and connected in series between the grid and the cathode with the first circuit between the grid and the second circuit, means supporting one of said elements of said first circuit adjacent said path for variation of the effective reactance of the element and the resonant frequency of the tuned circuit in response to movement of said member relative to the element, an output circuit connected between said anode and the junction of said resonant circuits, and a grid leak resistor and a capacitor connected in parallel circuits between said cathode and said grid to apply a negative bias to the latter and reduce current flow in said output circuit during oscillation of said oscillator, said first circuit having a predetermined resonant frequency when said member is in a predetermined position relative to said one element and said second circuit having an inductive reactance at frequencies lower than said resonant frequency and a capacitive reactance to provide regenerative feedback between said anode and said grid at frequencies higher than the predetermined frequency.

16. In apparatus for controlling a condition, the combination of, an oscillator comprising a vacuum tube having an anode, a cathode, and a control grid and two resonant circuits having reactance elements and connected in series between said grid and said cathode, means for changing the effective reactance of one of said elements in desponse to variation of said condition about a predetermined control value, an output circuit connected between said anode and the junction of said resonant circuits and including a source of voltage and a load impedance, and a grid leak resistor and a capacitor connected in parallel circuits between said grid and said cathode and operating to bias the grid negatively and reduce current flow in said output circuit during oscillation of said oscillator, said resonant circuit elements having values correlated to produce, between said cathode and said junction, an effective reactance which is inductive when the value of said controlled condition varies from said predetermined value in one sense and is capacitive to cooperate with the capacitive reactance between said grid and the cathode to provide a feedback between the grid and the anode for oscillation of said oscillator when the value of the condition varies from said predetermined value in the opposite sense.

17. The control apparatus of claim 16 in which said tube includes a heater filament separate from said cathode and having two terminals, one of said heater terminals is connected to said cathode directly and to said junction through a part of the one of said resonant circuits connected between the junction and the cathode, and the other of said terminals is connected to said junction through a source of energizing voltage in series with an impedance element presenting a high impedance to current of the frequency of oscillation of said oscillator.

18. The control apparatus of claim 16 in which said tube includes a heater filament separate from said cathode and having two terminals, one of said heater terminals is connected directly to said cathode, and said heater is connected in an energizing circuit extending in series through a source of voltage and an impedance element presenting a high impedance to current of the frequency of oscillation of said oscillator.

References Cited in the file of this patent

UNITED STATES PATENTS

| | | |
|---|---|---|
| 1,975,812 | Wallace | Oct. 9, 1934 |
| 2,066,027 | Braaten | Dec. 29, 1936 |
| 2,093,331 | Lynn | Sept. 14, 1937 |
| 2,115,858 | Keall | May 3, 1938 |
| 2,151,752 | Ellis | Mar. 28, 1939 |
| 2,189,402 | Pasma | Feb. 6, 1940 |
| 2,234,184 | MacLaren | Mar. 11, 1941 |
| 2,261,153 | Gieringer | Nov. 4, 1941 |
| 2,267,520 | Dow | Dec. 23, 1941 |
| 2,318,061 | Dailey | May 4, 1943 |
| 2,480,713 | Cherry | Aug. 30, 1949 |
| 2,505,577 | Rich | Apr. 25, 1950 |
| 2,647,252 | Moore | July 28, 1953 |